US006342995B1

(12) United States Patent
Jones

(10) Patent No.: US 6,342,995 B1
(45) Date of Patent: Jan. 29, 2002

(54) LIGHTED ESCUTCHEON PLATE FOR POWER DISTRIBUTION EQUIPMENT

(75) Inventor: Kent Jones, Palm Harbor, FL (US)

(73) Assignee: Instrument Transformers, Inc., Clearwater, FL (US)

( * ) Notice: Subject to any disclaimer, the term of this patent is extended or adjusted under 35 U.S.C. 154(b) by 0 days.

(21) Appl. No.: 09/517,840

(22) Filed: Mar. 2, 2000

(51) Int. Cl.[7] .................................................. H02H 3/00
(52) U.S. Cl. .......................................... 361/62; 361/114
(58) Field of Search ........................... 361/62, 114, 115; 340/638, 641

(56) References Cited

U.S. PATENT DOCUMENTS

| | | | | |
|---|---|---|---|---|
| 3,662,369 A | | 5/1972 | Vinsani et al. | 340/638 |
| 3,742,403 A | | 6/1973 | Nicol | 335/17 |
| 3,999,176 A | | 12/1976 | Kellogg et al. | 340/638 |
| 4,056,816 A | | 11/1977 | Guim | 340/638 |
| 4,250,476 A | | 2/1981 | Evans et al. | 335/17 |
| 4,633,240 A | | 12/1986 | Guim et al. | 340/638 |
| 4,652,867 A | | 3/1987 | Masot | 340/638 |
| 4,760,384 A | | 7/1988 | Vila-Masot | 340/638 |
| 4,768,025 A | | 8/1988 | Vila-Masot | 340/638 |
| 5,051,731 A | | 9/1991 | Guim et al. | 340/638 |
| 5,233,330 A | | 8/1993 | Hase | 340/638 |
| 5,343,192 A | | 8/1994 | Yenisey | 340/639 |
| 5,353,014 A | | 10/1994 | Carroll et al. | 340/638 |
| 5,517,381 A | * | 5/1996 | Guim et al. | 361/114 |
| 5,546,266 A | | 8/1996 | Mackenzie et al. | 361/115 |
| 5,638,243 A | * | 6/1997 | Torezan et al. | 361/42 |
| 5,739,737 A | | 4/1998 | Hatton | 337/706 |
| 5,847,913 A | | 12/1998 | Turner et al. | 361/115 |
| 5,909,180 A | | 6/1999 | Bailey et al. | 340/639 |

OTHER PUBLICATIONS

Page from Recent Electroswitch Catalog,“,”.

* cited by examiner

*Primary Examiner*—Peter S. Wong
*Assistant Examiner*—Lawrence Luk
(74) *Attorney, Agent, or Firm*—Dennis G. LaPointe; Mason & Associates, PA

(57) ABSTRACT

A lighted escutcheon plate for power distribution equipment includes an escutcheon plate in electrical communication with a power distribution circuit; and a plurality of LED bulbs, generally green or alternatively red, mounted on the escutcheon plate, so as to provide a visual indication of an open circuit status by lighting when the power distribution circuit is opened. The plate also includes a plurality of LED bulbs, generally red or alternatively green, mounted on the escutcheon plate, so as to provide a visual indication of a close circuit status by lighting when the power distribution circuit is closed. For tripped circuit conditions the plate includes a plurality of LED bulbs, generally yellow or amber, mounted on the escutcheon plate, so as to provide a visual indication of a trip circuit status by lighting when the power distribution circuit is tripped. Each of the plurality of LED bulbs are electrically connected and mounted such that should any of the plurality of LED bulbs fail, the remaining LED bulbs are capable of lighting to provide the visual indication of corresponding open, close and trip circuit status and the failed LED bulbs are capable of being replaced without interrupting the control power circuit. The plurality of LED bulbs used to indicate trip circuit status are electrically connected to flash on and off repetitively when lighted due to the trip circuit status.

22 Claims, 13 Drawing Sheets

STYLE 1
STANDARD LIGHT
CONFIGURATION

STYLE 1
STANDARD LIGHT CONFIGURATION

STYLE 1

STANDARD LIGHT CONFIGURATION

| LED VOLTAGE RATING | ROWS OF LEDS |
|---|---|
| 120VAC, 50/60Hz OR 125VDC | 2 |
| 240VAC, 50/60Hz OR 250VDC | 2 |
| 48VDC | 2 |
| 120VAC, 50/60Hz OR 125VDC | 3–4 |
| 240VAC, 50/60Hz OR 250VDC | 3–4 |
| 48VDC | 3–4 |

| INDICATION | COLOR | TERMINAL DESIGNATIONS | DISPLAY |
|---|---|---|---|
| OPEN | GREEN | A & D | STEADY |
| CLOSE | RED | B & E | STEADY |
| *TRIPPED | YELLOW | C & F | FLASHING |

* WHEN PRESENT

FIG 3

STYLE 2

REVERSED LIGHT CONFIGURATION

| LED VOLTAGE RATING | ROWS OF LEDS |
|---|---|
| 120VAC, 50/60Hz OR 125VDC | 2 |
| 240VAC, 50/60Hz OR 250VDC | 2 |
| 48VDC | 2 |
| 120VAC, 50/60Hz OR 125VDC | 3-4 |
| 240VAC, 50/60Hz OR 250VDC | 3-4 |
| 48VDC | 3-4 |

| INDICATION | COLOR | TERMINAL DESIGNATIONS | DISPLAY |
|---|---|---|---|
| OPEN | RED | A & D | STEADY |
| CLOSE | GREEN | B & E | STEADY |
| *TRIPPED | YELLOW | C & F | FLASHING |

* WHEN PRESENT

FIG 4

LIGHTED ESCUTCHEON PLATE FOR POWER DISTRIBUTION EQUIPMENT

BACKGROUND OF THE INVENTION

1. Field of the Invention

The invention relates to a lighted switch or remote panel plate with multiple replaceable light emitting diodes in banks that remain lighted when one or more fail, for use in power distribution systems.

2. Description of Related Art

The use of LED lights in power distribution control circuits are known in the art. However, they are generally on the circuit breaker itself or should an LED bulb fail, you lose indication of operating status.

Known related art includes the use of LED bulbs incorporated into a circuit breaker as depicted in U.S. Pat. No. 5,353,014 to Carroll et al., U.S. Pat. No. 5,847,913 to Turner et al., U.S. Pat. No. 3,662,369 to Vinsani et al., U.S. Pat. Nos. 4,056,816, 5,051,731 and 4,633,240 to Guim, and an LED bulb incorporated into an electrical power load center panel as depicted in U. S, Pat. No. 5,909,180 to Bailey et al.

Other known related indicator apparatus for power distribution circuits incorporate lamps for a circuit breaker such as depicted in U.S. Pat. No. 3,742,403 to Nicol and U.S. Pat. No. 3,999,176 to Kellogg et al.

None of the devices in the above references solve the problem of providing reliable and low cost indicating equipment in power handling distribution equipment. Most indicator bulbs as noted above which are incorporated into the breakers themselves, are not readily visible to operators so operators can immediately note the operating circuit status. Therefore, in power distribution equipment, pilot lights are often used for status indication. Traditionally, these have been incandescent bulbs, but these fail regularly, due to filament burn out and vibration damage. Recently, clusters of LED's have also been used. Additionally, these traditional pilot indicators are stand alone units. This meant that the unit must be mounted and wired. The adaptation of an escutcheon plate, particularly with a control switch escutcheon plate, solves the above described problems. By incorporating LED bulbs in a switch escutcheon plate, the cost of individual lamps and sockets is saved and the cost of mounting them is also avoided.

Others have addressed these problems in different ways. For example, others have incorporated transformers and resistors into light sockets to reduce the voltage across the incandescent filament. This is very costly. Another way is to incorporate LED clusters that plug or screw into light sockets. However, when an LED bulb fails, indication is lost while they are being replaced and the use of a separately mounted lamp holder is not eliminated. Otherwise, LED bulbs have been incorporated directly into the escutcheon plate as commercially sold by Electroswitch's light duty control switch Model No. 644-6C. However, should any of the LED bulbs fail, status indication is lost and ease of service is not present. Loss of status indication could cause an operator working on the equipment not to realize that power is present or that power is not available to operate the circuit breaker.

The results obtained by the present invention is to offer uninterrupted status indication to the user at reduced installed costs and maintenance costs. This long felt need has not been satisfied because power engineers in the power distribution equipment manufacturing industry were simply not motivated to incorporate electronics into the equipment or components to increase operating safety since the trend in the industry is to simply "buy-out" commercially available off-the-shelf components.

SUMMARY OF THE INVENTION

The present invention is an escutcheon plate, with or without a switch handle for manually opening and closing a circuit, incorporating LED bulbs externally to the escutcheon plate with pairs of LED bulbs being bridges with a zener diode bridge so should an LED bulb fail, status indication will not be lost. In addition, the failed LED bulb is easily replaceable without interrupting the circuitry.

The invention is further adapted such that when a trip condition occurs, the amber or yellow colored LED bulbs flash or blink "on" and "off" repetitively, thereby giving an operator an immediate warning of a tripped circuit condition.

The present invention is a lighted escutcheon plate for power distribution equipment. It includes an escutcheon plate with terminals on a back side for electrical communication with a control power circuit. A first plurality of LED bulbs of a predetermined color is mounted in a predetermined arrangement on the escutcheon plate. The first plurality of LED bulbs is visible from the front side of the escutcheon plate, so as to provide a visual indication of an open circuit status by lighting when the power distribution circuit is opened.

A second plurality of LED bulbs of a predetermined color is also mounted in a predetermined arrangement on the escutcheon plate. The second plurality of LED bulbs is again visible from a front side of the escutcheon plate, so as to provide a visual indication of a close circuit status by lighting when the power distribution circuit is closed.

The first and second plurality of LED bulbs are electrically connected and mounted such that should any of the LED bulbs fail, the remaining LED bulbs are capable of lighting to provide the visual indication of the open or close circuit status and the failed LED bulbs are capable of being replaced from the front side of the escutcheon plate without interrupting the control power circuit.

The invention further includes a third plurality of LED bulbs of a predetermined color mounted in a predetermined arrangement on the escutcheon plate. The third plurality of LED bulbs is also visible from the front side of the escutcheon plate, so as to provide a visual indication of a trip circuit status by lighting when the power distribution circuit is tripped. The third plurality of LED bulbs is further electrically connected and mounted such that should any of the LED bulbs fail, the remaining LED bulbs are capable of lighting to maintain the visual indication of the trip circuit status. In addition, the failed LED bulbs are capable of being replaced from the front side of the escutcheon plate without interrupting the control power circuit. The third plurality of LED bulbs are also electrically connected to flash "on" and "off" repetitively when lighted due to the trip circuit status.

Generally, the first plurality of LED bulbs is arranged in one of a single row and a single column, that is, in columnar form if mounted to the respective left and right sides of the front surface of the escutcheon plate or in a row arrangement if mounted to the respective top and bottom sides of the front surface of the escutcheon plate. No matter where located, the escutcheon plate would typically be labeled by engraving or other methods known in the art, near the row or column of LED bulbs to indicate that the LED bulbs represent open circuit status.

Similarly the second plurality of LED bulbs is arranged in one of a single row and a single column as the first plurality of LED bulbs, except that the labeling on the escutcheon plate would indicate close circuit status. In addition, the third plurality of LED bulbs is similarly arranged in one of a single row and a single column, except that the labeling on the escutcheon plate would note trip circuit status. In a typical application of the invention, the third plurality of LED bulbs may be arranged in one of two separate single rows and two separate single columns, that is, there may be one row on the top side of the front surface of the escutcheon plate and a second row on the bottom side of the front surface of the escutcheon plate. This dual set of LED bulb arrangement will enhance the visibility of the flashing LED bulbs warning of a trip circuit status for the operators.

The lighted escutcheon plate, for power distribution equipment according to the invention may have two different styles or embodiments regarding the color of the first and second plurality of LED bulbs. The first plurality of LED bulbs could typically be one of green colored LED bulbs and red colored LED bulbs, and the second plurality of LED bulbs typically include the corresponding opposite color, that is, red colored LED bulbs and green colored LED bulbs.

The third plurality of LED bulbs is anticipated to be the industry standard yellowish tinted color bulbs, in particular, yellow and amber.

In order to provide reliability by having no loss of status indication despite an LED bulb failure, each of the first plurality of LED bulbs, the second plurality of LED bulbs and the third plurality of LED bulbs include a zener diode bridge circuit across each pair of LED bulbs in series succession so that should one of the LED bulbs fail, a voltage will increase across the pair of LED bulbs having the failed LED bulb to cause the remaining LED bulbs in the corresponding first, second and third plurality of LED bulbs to remain lighted, thereby not losing corresponding open, close and trip circuit status indication. For example, if there are six LED bulbs in a bank of bulbs, then each two or pair of LED bulbs is bridged with a zener diode bridge. In this case, although both bulbs would not light with the actual failure of one bulb, the remaining four LED bulbs in the bank of bulbs will remain lighted.

In most applications, it is anticipated that the escutcheon plate is a control switch plate having handle means extending from the front side of the escutcheon plate for manually opening and closing of the power distribution circuit. However, in many applications where the operator may be some distance from the control switch, a remote panel or escutcheon plate may be required to provide real time status indication to the operator. In this case, the remotely located escutcheon plate will be in electrical communication with the power distribution circuit and more than likely, directly wired into the control switch escutcheon plate terminals.

BRIEF DESCRIPTION OF THE DRAWINGS

For a fuller understanding of the nature and objects of the invention, reference should be made to the following detailed description, taken in connection with the accompanying drawings, in which:

FIG. 3 is a table listing various LED voltage ratings and corresponding light arrangements for the embodiment of FIG. 1*a;*

FIG. 4 is a table listing various LED voltage ratings and corresponding light arrangements for the embodiment of FIG. 1*b;*

DETAILED DESCRIPTION OF THE INVENTION

Figure 1A:
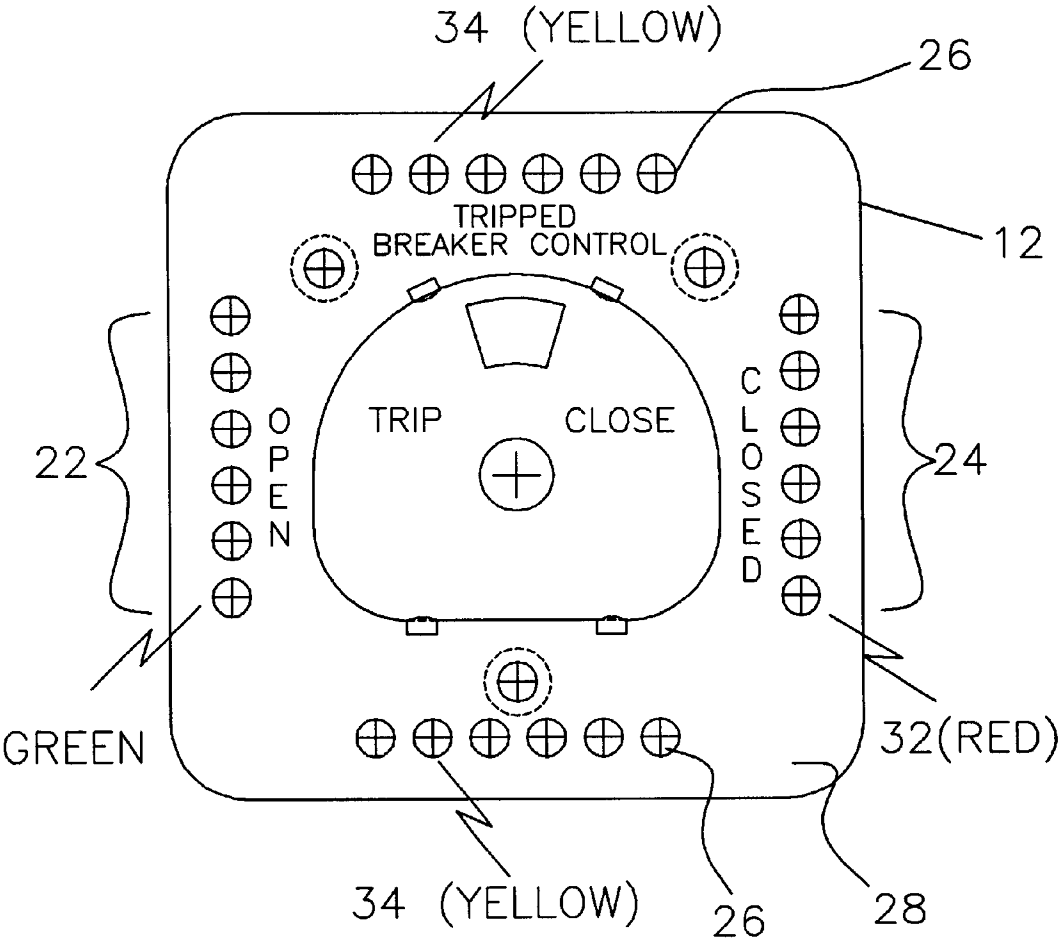
FIG. 1*a* is a frontal view diagram of one embodiment of the invention depicting a control switch escutcheon plate.
Figure 1B:
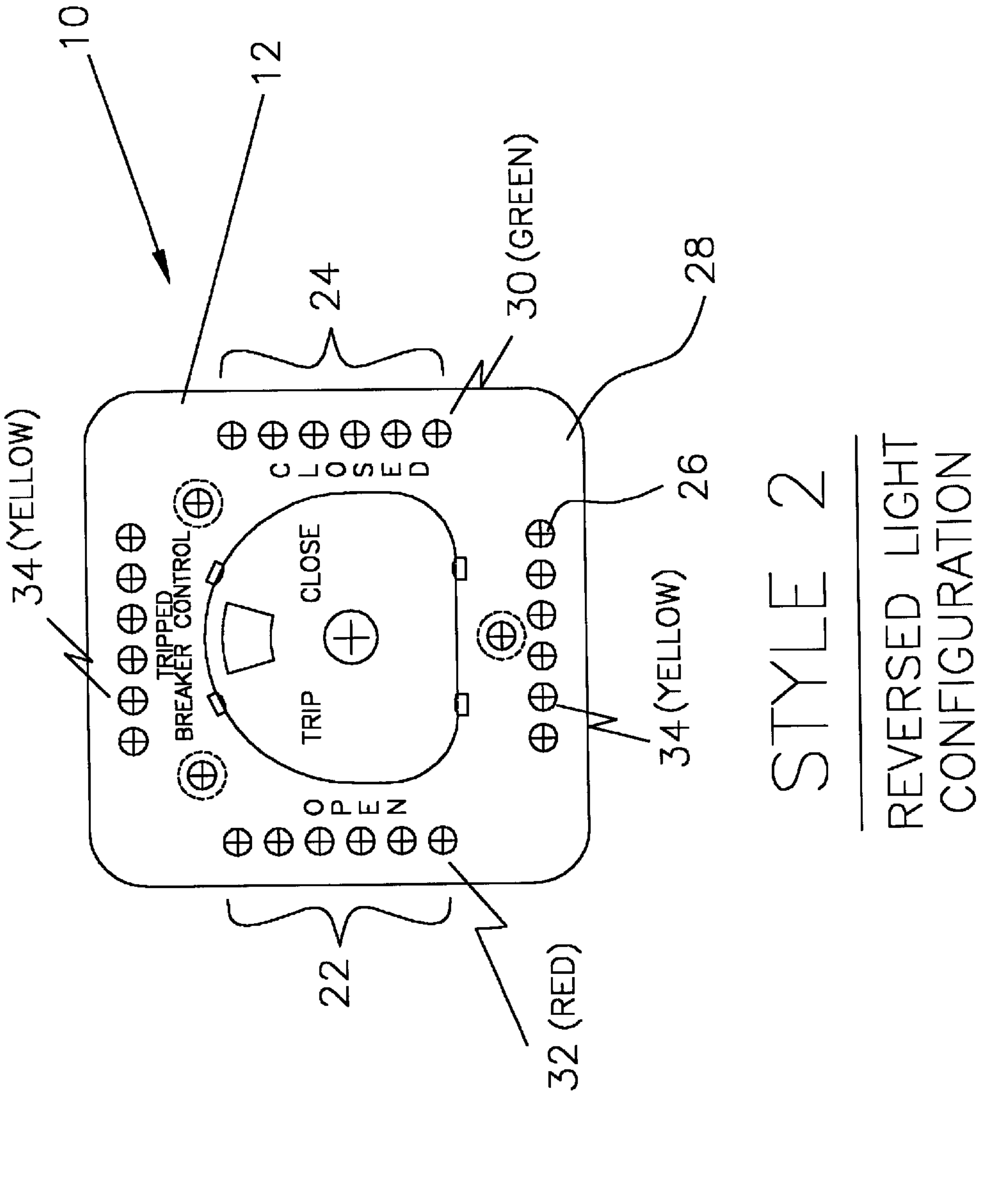
FIG. 1*b* is a frontal view diagram of the embodiment of FIG. 1*a* with the light arrangement for open and close circuit status reversed from that shown in FIG. 1*a;*
Figure 7A:
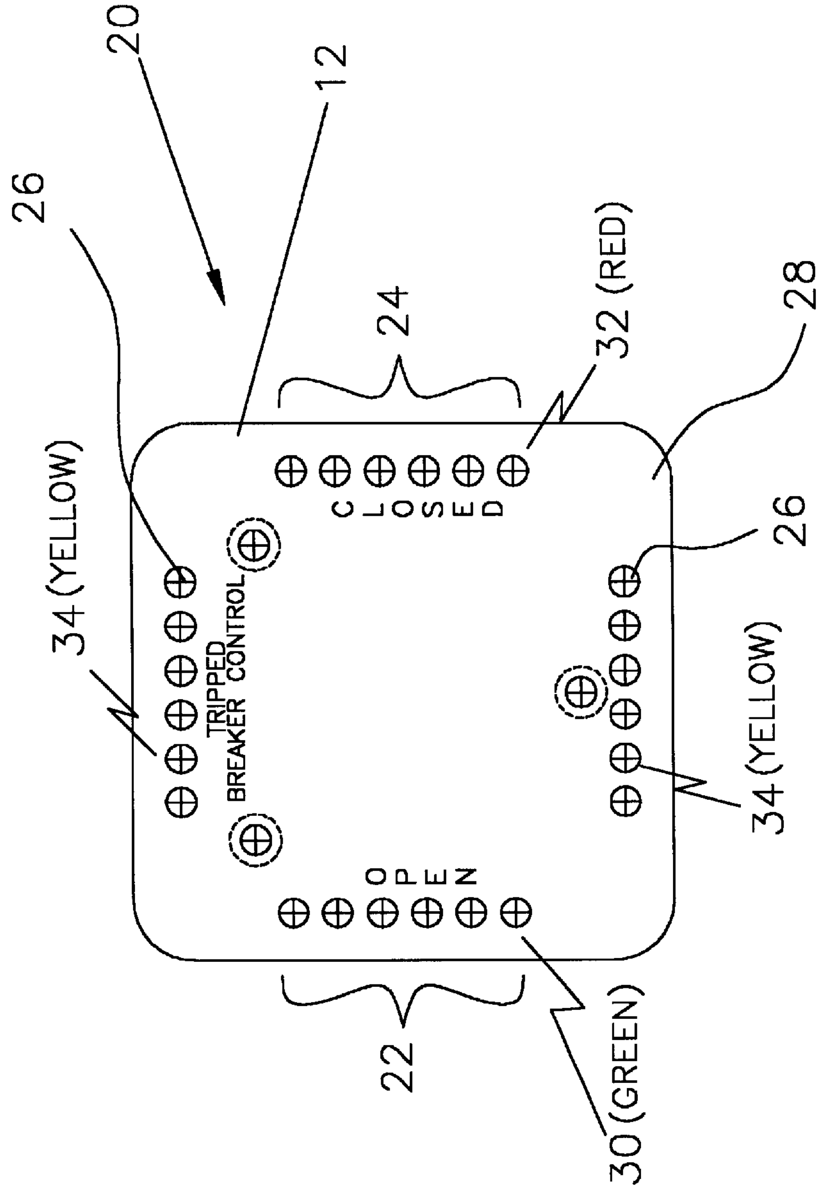
FIG. 7*a* is a frontal view diagram of an embodiment of the invention depicting an escutcheon plate without the switch mechanism.
Figure 7B:
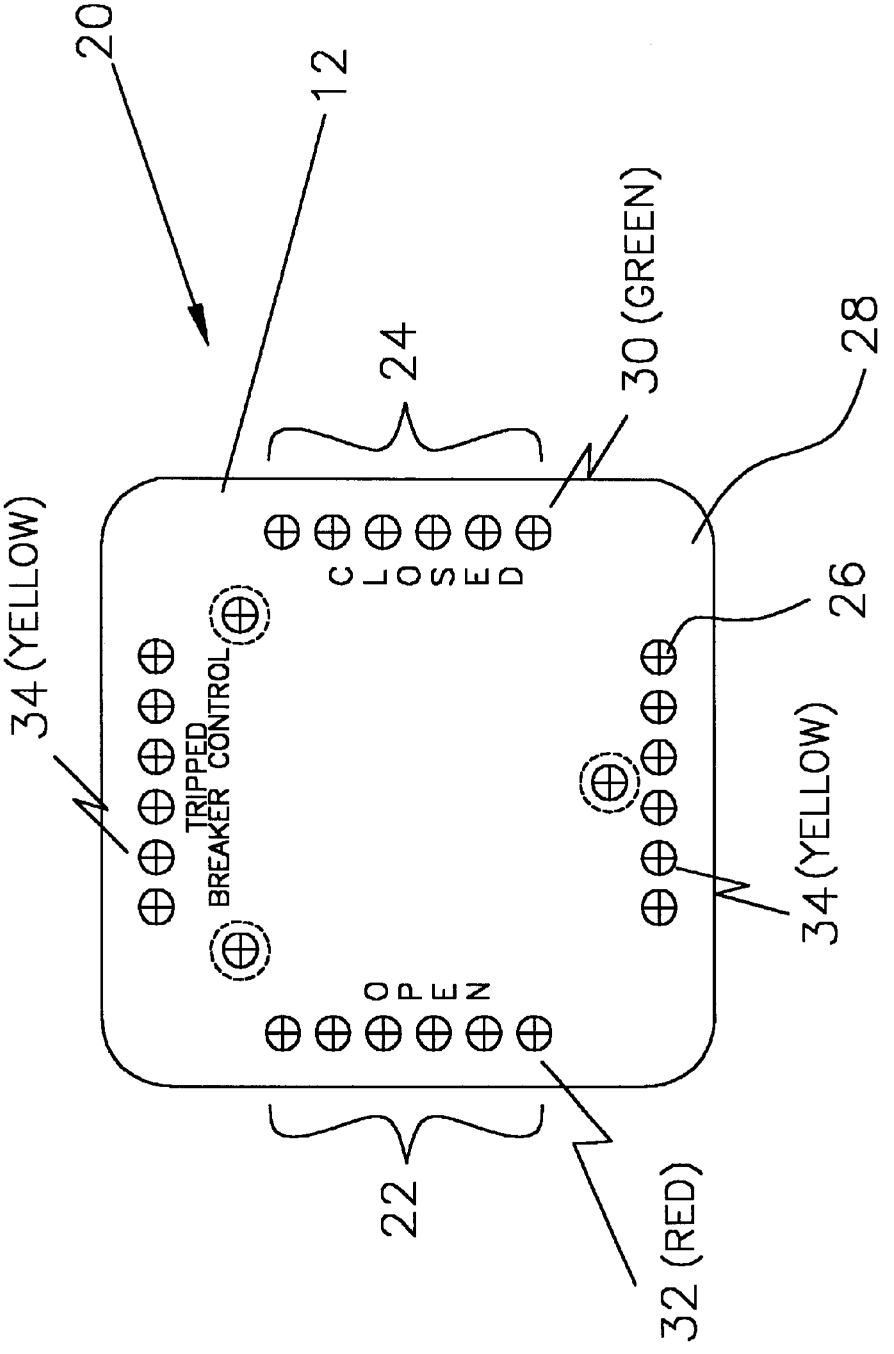
FIG. 7*b* is a frontal view diagram of an embodiment of the invention depicting an escutcheon plate without the switch mechanism and with the open and close circuit status light indicators being reversed from the embodiment of FIG. 7*a;*

Referring now to the drawings, in particular FIGS. 1*a*, 1*b*, 7*a* and 7*b*, the invention which is a lighted escutcheon plate for power distribution equipment and is depicted generally as 10 in FIGS. 1*a*–1*b* and 20 in FIGS. 7*a*–7*b*, comprises an escutcheon plate 12, the escutcheon plate 12 having terminals 14A–14F on a back side 16 for electrical communication using control power circuit 18; a first plurality of LED bulbs 22 of a predetermined color mounted in a predetermined arrangement on the escutcheon plate 12, the first plurality of LED bulbs 22 being visible from a front side 28 of the escutcheon plate 12, so as to provide a visual indication of an open circuit status by lighting when the power distribution circuit is opened; a second plurality of LED bulbs 24 of a predetermined color mounted in a predetermined arrangement on the escutcheon plate 12, the second plurality of LED bulbs 24 being visible from a front side 28 of the escutcheon plate 12, so as to provide a visual indication of a close circuit status by lighting when the power distribution circuit is closed; the first plurality of LED bulbs 22 being electrically connected and mounted such that should any of the first plurality of LED bulbs 22 fail, the remaining LED bulbs are capable of lighting to provide the visual indication of the open circuit status and the failed LED bulbs are capable of being replaced from the front side 28 of the escutcheon plate 12 without interrupting the control circuit 18; and the second plurality of LED bulbs 24 being electrically connected and mounted such that should any of the second plurality of LED bulbs 24 fail, the remaining LED bulbs are capable of lighting to provide the visual indication of the close circuit status and the failed LED bulbs are capable of being replaced from the front side 28 of the escutcheon plate 12 without interrupting the control power circuit 18.

The present invention may also include a third plurality of LED bulbs 26 of a predetermined color mounted in a predetermined arrangement on the escutcheon plate 12, the third plurality of LED bulbs 26 being visible from a front side 28 of the escutcheon plate 12, so as to provide a visual indication of a trip circuit status by lighting when the power distribution circuit is tripped; and the third plurality of LED bulbs 26 being electrically connected and mounted such that should any of the third plurality of LED bulbs 26 fail, the remaining LED bulbs are capable of lighting to provide the visual indication of the trip circuit status and the failed LED bulbs are capable of being replaced from the front side 28 of the escutcheon plate 12 without interrupting the control power circuit 18.

Figure 2:
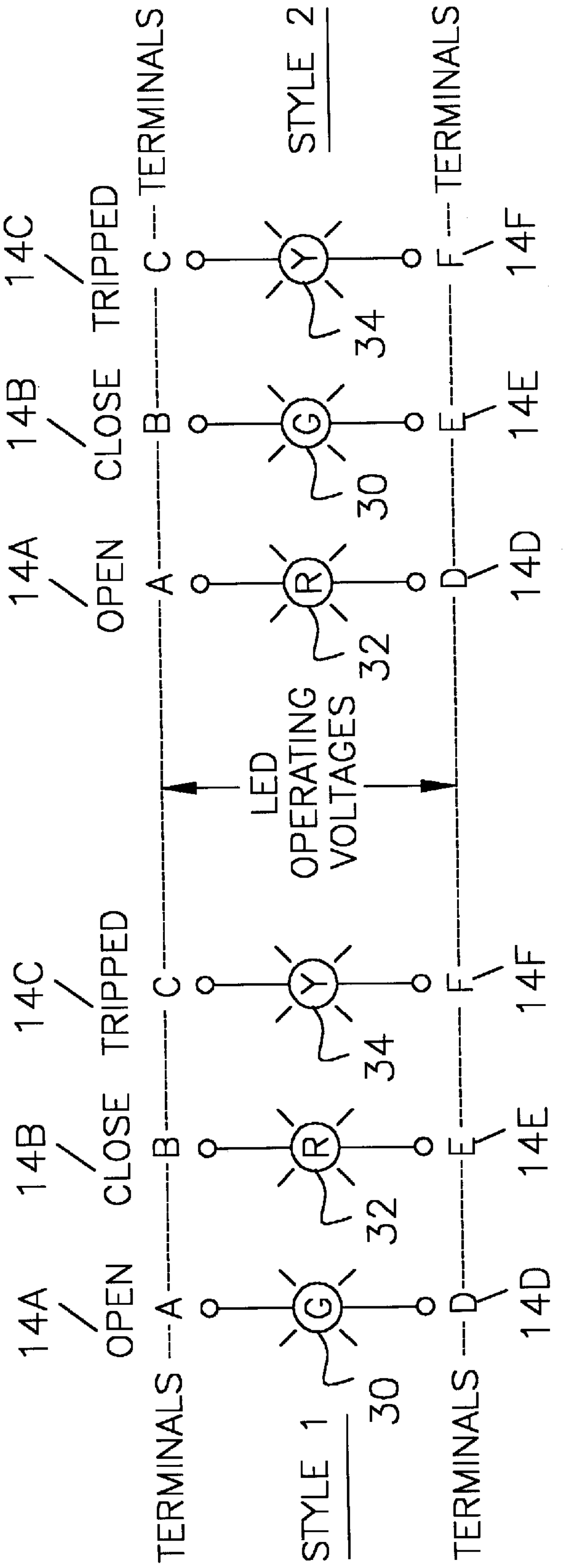
FIG. 2 is a conceptual wiring schematic for the embodiments of FIGS. 1*a* and 1*b;*
Figure 6:
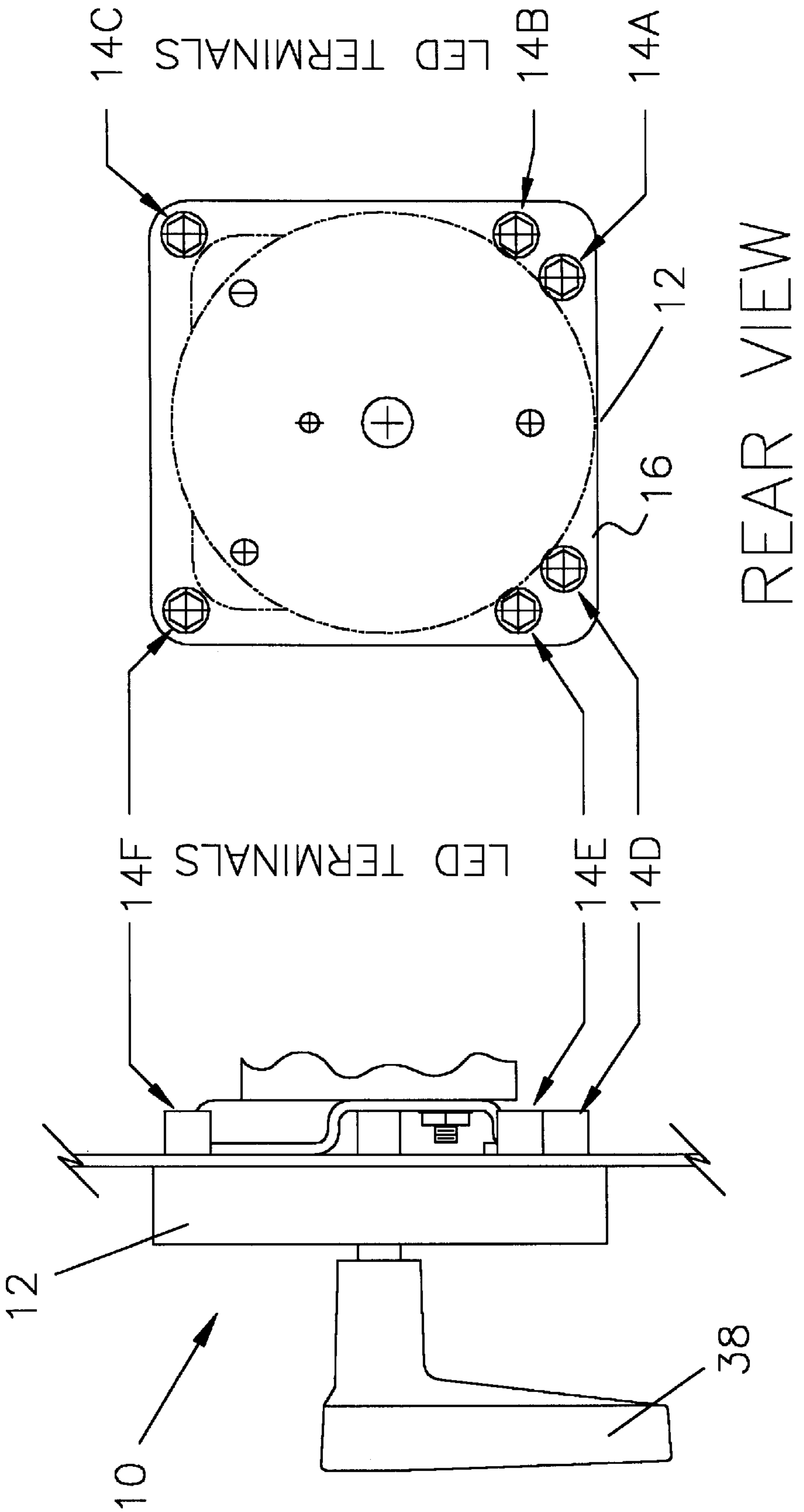
FIG. 6 is a schematic of a typical control switch.

As shown in FIG. 6, the escutcheon plate 12 for incorporation into the present invention would typically have terminals 14A–14F accessible on the back side 16 of the escutcheon plate 12. FIG. 2 depicts two different anticipated styles wherein style 1 shows the application of green (G) colored LED bulbs 30 for open status indication, red (R) colored LED bulbs 32 for close status indication, and yellow (Y) colored LED bulbs 34 for trip status indication. This light configuration is anticipated to be a standard application of the invention as shown in FIGS. 1*a* and 7*a*. FIG. 2 also shows a conceptual depiction of a reversed light configuration, that is, style 2 which incorporates the green (G) colored LED bulbs 30 for close circuit status indication and red(R) colored LED bulbs 32 for open circuit status indication. The reversed light configuration is also shown in FIGS. 1*b* and 7*b*.

Figure 5A:
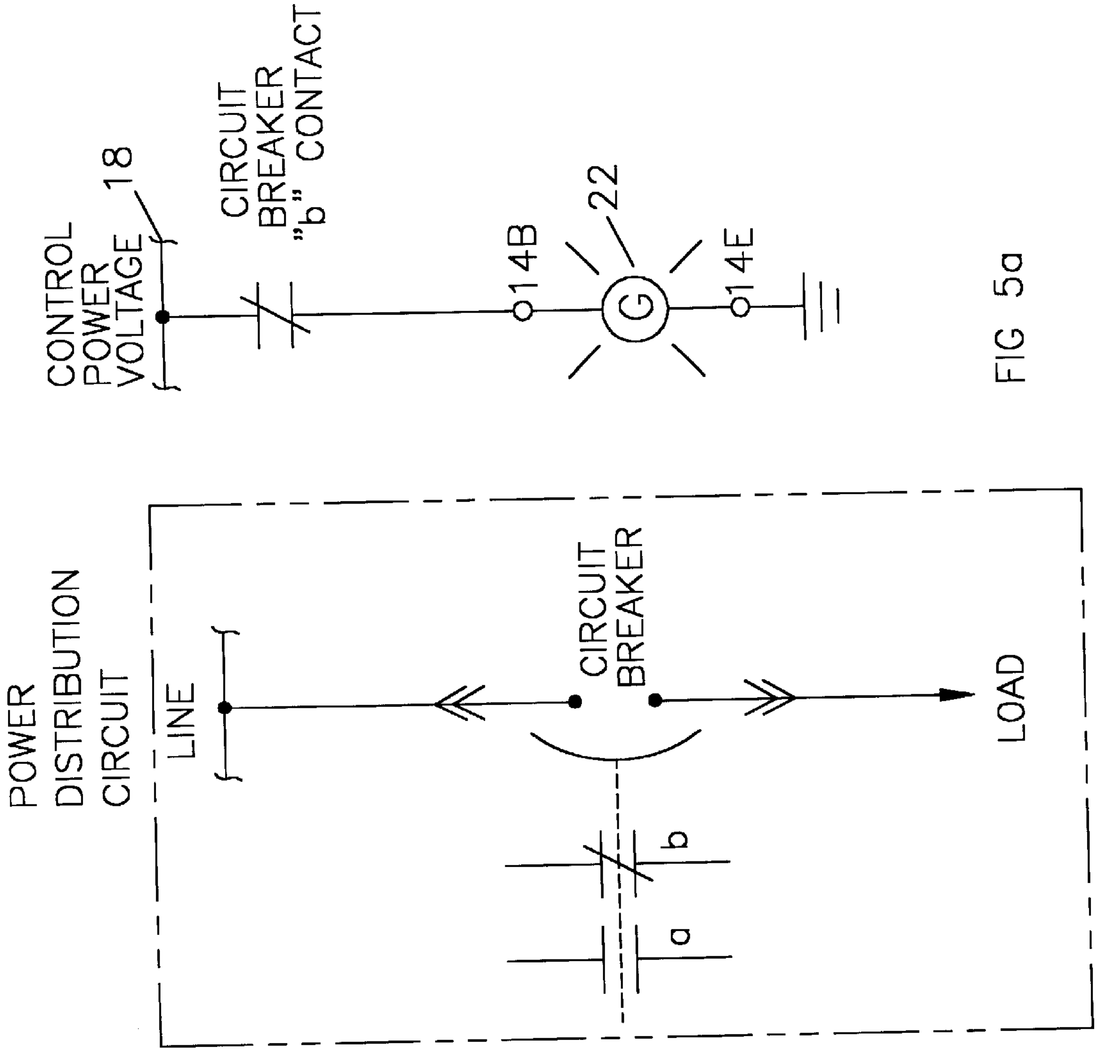
FIG. 5*a* is a conceptual wiring schematic for green lights indicating a closed circuit.
Figure 5B:
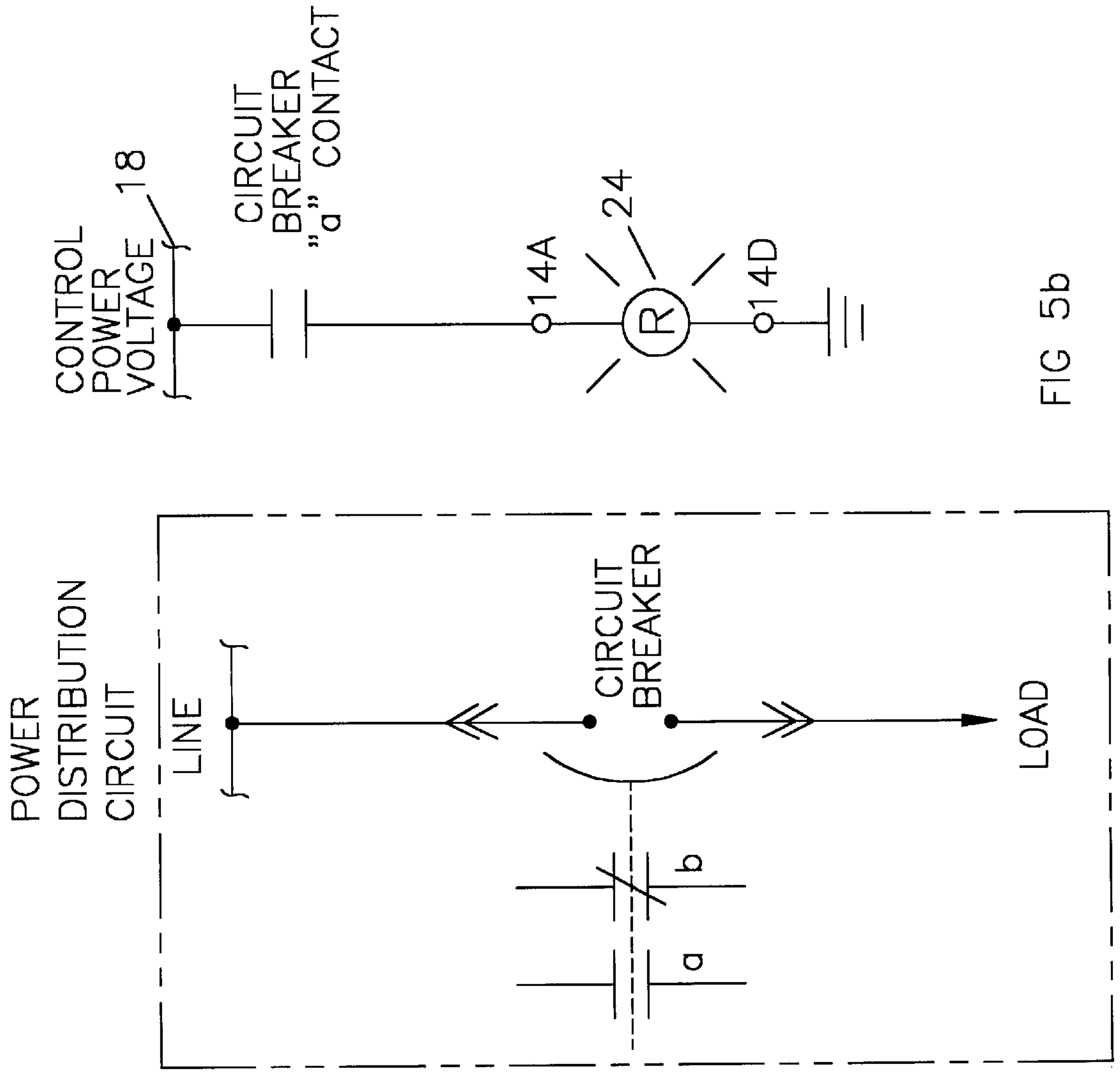
FIG. 5*b* is a conceptual wiring schematic for red lights indicating an open circuit.
Figure 5C:
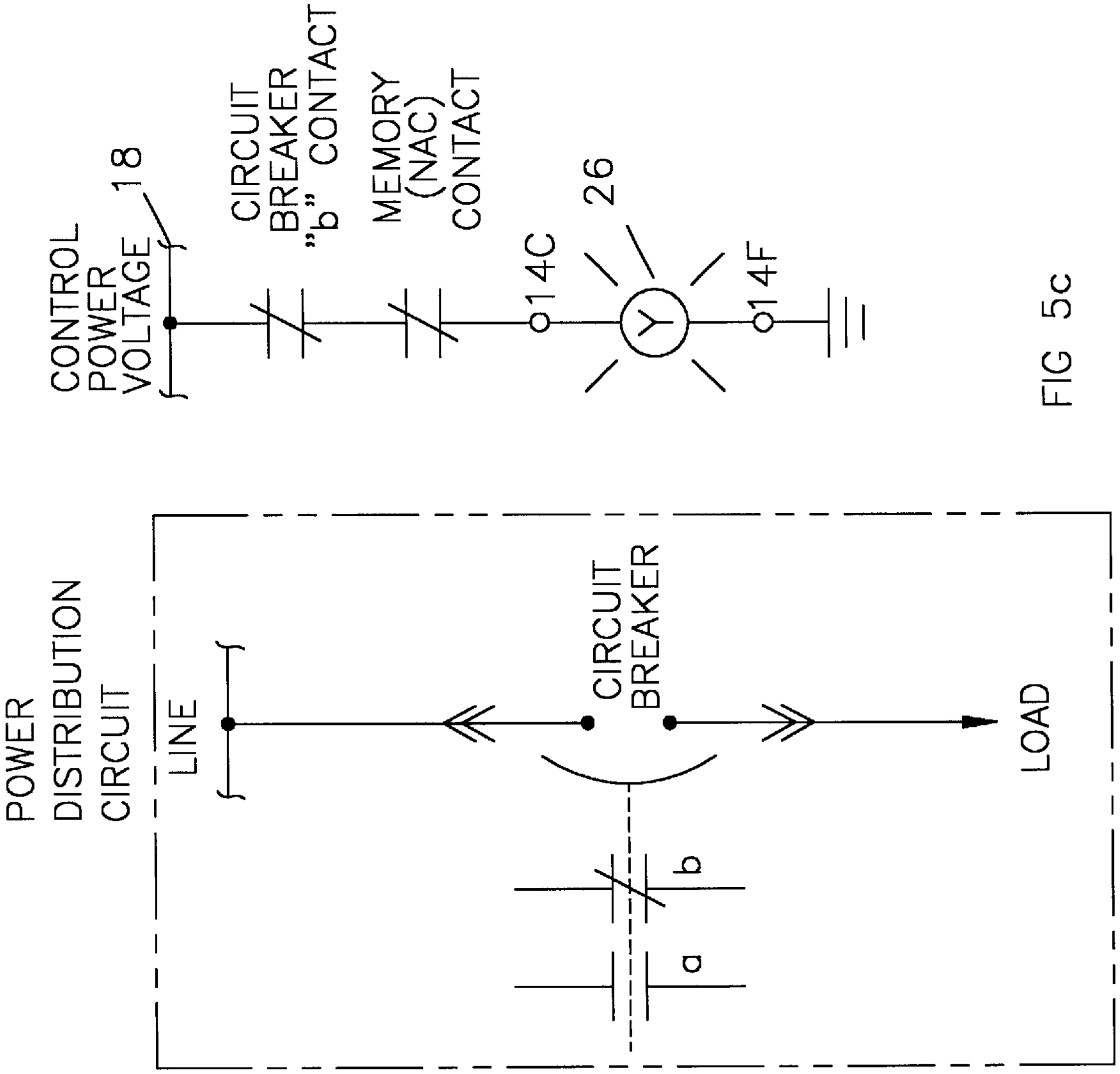
FIG. 5*c* is a conceptual wiring schematic for blinking yellow lights indicating a tripped circuit.

FIG. 3 is a representative tabulation depicting typical LED voltage ratings, anticipated number of rows of LED bulbs, and a practical application of the color designation or determination and display result for the style 1 arrangement of FIGS. 1*a* and 7*a*. Similarly, FIG. 4 is an equivalent tabulation for the style 2 arrangement of FIGS. 1*b* and 7*b*. In a typical application, the LED bulbs corresponding to open, close or tripped status indication may provide a steady light when activated; however, it is preferred that the tripped status indication yellow LED bulbs 34 flash or blink "on" and "off" repetitively to enhance the warning effect of a tripped circuit. A typical conceptual wiring diagram for a Style 1 escutcheon plate is shown in FIGS. 5*a*–5*c* which depicts a typical functional relationship of the lights to the circuit breaker operating contacts. For example, in the flashing circuit shown in FIG. 5*c*, if there is a fault in the power distribution circuit and the circuit breaker trips, an auxiliary switch contact (bell circuit) in the circuit breaker will close and the yellow LED bulbs 34 will begin to flash "on and off". Also see FIG. 8*a*.

The escutcheon plate 12, as a minimum, will have a first plurality of LED bulbs 22 and a second plurality of LED bulbs 24. However, it is preferred to incorporate at least one row or column of a third plurality of LED bulbs 26 to indicate trip circuit status.

Practically, it is desirable to have the first plurality of LED bulbs 22 arranged in a single row or a single column as shown in FIGS. 1*a*, 1*b* 7*a* and 7*b*; however, a bank of two rows or columns would be acceptable. For example, a row or column may consist of six LED bulbs or two rows or columns of 3—4 LED bulbs in each row or column, the rows or column being grouped together. The second plurality of LED bulbs 24 may be similarly arranged.

Although the third plurality of LED bulbs 26 may be similarly arranged in a single row, a single column or a bank of two rows or columns of LED bulbs grouped together, it is preferable that the third plurality of LED bulbs 26 be arranged in two separate single rows or two separate single columns, generally at opposite sides of the front side 28 of the escutcheon plate 12 as depicted in FIGS. 1*a*, 1*b*, 7*a* and 7*b*.

As discussed above for the anticipated style 1 and style 2 configuration of lights, a practical application of the invention would incorporate green colored LED bulbs 30 for the first plurality of LED bulbs 22 and red colored LED bulbs 32 for the second plurality of LED bulbs 24 or the reversed configuration would have red colored LED bulbs 32 for the first plurality of LED bulbs 22 and green colored LED bulbs 30 for the second plurality of LED bulbs 24.

The third plurality of LED bulbs 26 are generally yellowish color. An amber color, for example, is acceptable in the industry.

A novel feature of the present invention heretofore not incorporated in such escutcheon plates for power distribution circuits is that should an LED short circuit, all others will remain lighted. If an LED open circuits, only two LED bulbs will not light. Further, failed LED bulbs can be removed by pulling the LED bulb straight out and the failed LED bulb can be replaced without deenergizing the circuit.

Figure 8A:
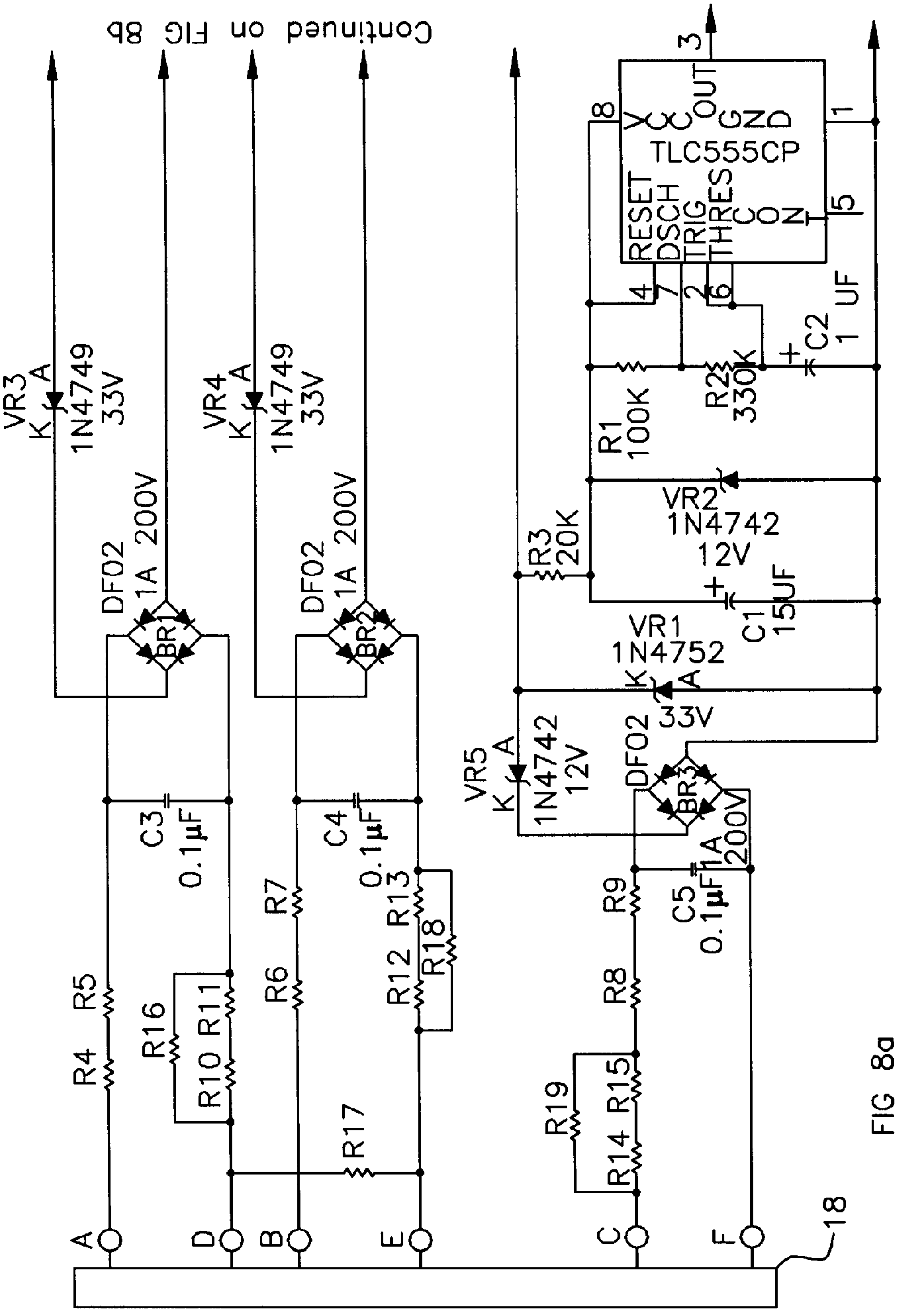
FIG. 8*a* is a practical application of a schematic wiring diagram of a part of the circuitry for the LED bulbs.
Figure 8B:
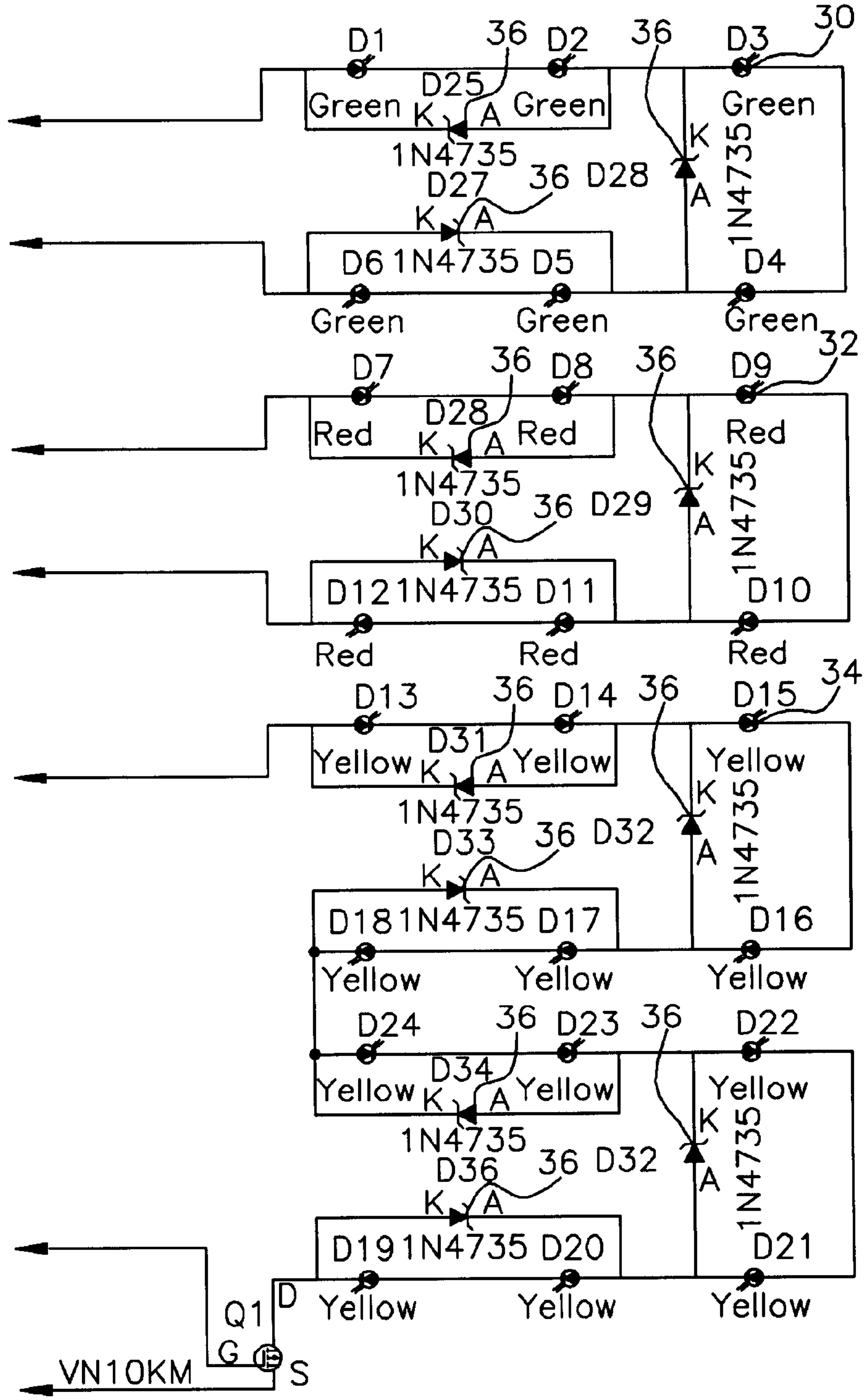
FIG. 8*b* is a continuation of the schematic wiring diagram of FIG. 8*a*.

This is accomplished by including in the circuitry for the LED bulbs, zener diode bridge circuits 36 as shown in FIGS. 8*a* and 8*b*. For the first plurality of LED bulbs 22 and the second plurality of LED bulbs 24, a zener diode bridge circuit 36 is placed across each pair of LED bulbs in series succession so that should one of the LED bulbs fail, a voltage will increase across the pair of LED bulbs having the failed LED bulb to cause the remaining LED bulbs in the corresponding first and second plurality of LED bulbs 22,24 to remain lighted, thereby not losing corresponding open and close circuit status indication.

Similarly, the third plurality of LED bulbs 26 includes a zener diode bridge circuit 36 across each pair of LED bulbs in series succession so that should one of the LED bulbs fail, a voltage will increase across the pair of LED bulbs having the failed LED bulb to cause the remaining LED bulbs in the third plurality of LED bulbs 26 to remain lighted, thereby not losing trip circuit status indication.

As shown in FIG. 6, the escutcheon plate 12 in the present invention may be a control switch plate having handle means 38 extending from the front side 28 of the escutcheon plate 12 for manually opening and closing of the power distribution circuit. In another practical application of the present invention, the invention takes the form of a remotely located device wherein the escutcheon plate 12 is remotely located and in electrical communication with a control switch plate having handle means 38 extending from the front side 28 of the escutcheon plate 12 for manually opening and closing of the power distribution circuit. The advantage to this alternative embodiment is that in circumstances where an operator may have an obstructed view of the control switch plate, the operator can have a remotely located escutcheon plate 12 incorporating the open, close and trip status indication LED bulbs which is located near the operator's workstation and is viewed without any obstruction.

As seen from the foregoing description, the present invention satisfies a long felt need to provide a device which improves reliability and safety, while reducing costs, in the operation of power distribution equipment.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A lighted escutcheon plate for power distribution equipment comprising:

an escutcheon plate, the escutcheon plate having terminals on a back side for electrical communication using a control power circuit;

a first plurality of LED bulbs of a predetermined color mounted in a predetermined arrangement on the escutcheon plate, the first plurality of LED bulbs being visible from a front side of the escutcheon plate, so as to provide a visual indication of an open circuit status by lighting when the power distribution circuit is opened;

a second plurality of LED bulbs of a predetermined color mounted in a predetermined arrangement on the escutcheon plate, the second plurality of LED bulbs being visible from a front side of the escutcheon plate, so as to provide a visual indication of a close circuit status by lighting when the power distribution circuit is closed;

the first plurality of LED bulbs being electrically connected and mounted such that should any of the first plurality of LED bulbs fail, the remaining LED bulbs are capable of lighting to provide the visual indication of the open circuit status and the failed LED bulbs are capable of being replaced from the front side of the escutcheon plate without interrupting the control power circuit; and the second plurality of LED bulbs being electrically connected and mounted such that should any of the second plurality of LED bulbs fail, the remaining LED bulbs are capable of lighting to provide the visual indication of the close circuit status and the failed LED bulbs are capable of being replaced from the front side of the escutcheon plate without interrupting the control power circuit.

2. The lighted escutcheon plate for power distribution equipment according to claim 1, further comprising:

a third plurality of LED bulbs of a predetermined color mounted in a predetermined arrangement on the escutcheon plate, the third plurality of LED bulbs being visible from a front side of the escutcheon plate, so as to provide a visual indication of a trip circuit status by lighting when the power distribution circuit is tripped; and the third plurality of LED bulbs being electrically connected and mounted such that should any of said third plurality of LED bulbs fail, the remaining LED bulbs are capable of lighting to provide the visual indication of the trip circuit status and the failed LED bulbs are capable of being replaced from the front side of the escutcheon plate without interrupting the control power circuit.

3. The lighted escutcheon plate for power distribution equipment according to claim 2, wherein the third plurality of LED bulbs are electrically connected to flash on and off repetitively when lighted due to the trip circuit status.

4. The lighted escutcheon plate for power distribution equipment according to claim 1, wherein the first plurality of LED bulbs is arranged in one of a single row and a single column.

5. The lighted escutcheon plate for power distribution equipment according to claim 1, wherein the second plurality of LED bulbs is arranged in one of a single row and a single column.

6. The lighted escutcheon plate for power distribution equipment according to claim 2, wherein the third plurality of LED bulbs is arranged in one of a single row and a single column.

7. The lighted escutcheon plate for power distribution equipment according to claim 2, wherein the third plurality of LED bulbs is arranged in one of two separate single rows and two separate single columns.

8. The lighted escutcheon plate for power distribution equipment according to claim 1, wherein the LED bulb colors for the first plurality of LED bulbs and corresponding second plurality of LED bulbs are one of green colored LED bulbs for the first plurality of LED bulbs and red colored LED bulbs for the corresponding second plurality of LED bulbs, and red colored LED bulbs for the first plurality of LED bulbs and green colored LED bulbs for the corresponding second plurality of LED bulbs.

9. The lighted escutcheon plate for power distribution equipment according to claim 1, wherein the third plurality of LED bulbs are one of yellow and amber colored LED bulbs.

10. The lighted escutcheon plate for power distribution equipment according to claim 1, wherein each of the first plurality of LED bulbs and the second plurality of LED bulbs include a zener diode bridge circuit across each pair of LED bulbs in series succession so that should one of the LED bulbs fail, a voltage will increase across the pair of LED bulbs having the failed LED bulb to cause the remaining LED bulbs in the corresponding first and second plurality of LED bulbs to remain lighted, thereby not losing corresponding open and close circuit status indication.

11. The lighted escutcheon plate for power distribution equipment according to claim 2, wherein the third plurality of LED bulbs includes a zener diode bridge circuit across each pair of LED bulbs in series succession so that should one of the LED bulbs fail, a voltage will increase across the pair of LED bulbs having the failed LED bulb to cause the remaining LED bulbs in the third plurality of LED bulbs to remain lighted, thereby not losing trip circuit status indication.

12. The lighted escutcheon plate for power distribution equipment according to claim 2, wherein the escutcheon plate is a control switch plate having handle means extending from the front side of the escutcheon plate for manually opening and closing of the power distribution circuit.

13. The lighted escutcheon plate for power distribution equipment according to claim 2, wherein the escutcheon plate is remotely located and in electrical communication with a control switch plate having handle means extending from the front side of the escutcheon plate for manually opening and closing of the power distribution circuit.

14. The lighted escutcheon plate for power distribution equipment according to claim 12, wherein the escutcheon plate is remotely located and in electrical communication with the control switch plate having handle means extending from the front side of the escutcheon plate for manually opening and closing of the power distribution circuit.

15. A lighted escutcheon plate for power distribution equipment comprising:

an escutcheon plate, the escutcheon plate having terminals on a back side for electrical communication using a control power circuit;

a first plurality of LED bulbs of a predetermined color mounted in a predetermined arrangement on the escutcheon plate, the first plurality of LED bulbs being visible from a front side of the escutcheon plate, so as to provide a visual indication of an open circuit status by lighting when the power distribution circuit is opened;

a second plurality of LED bulbs of a predetermined color mounted in a predetermined arrangement on the escutcheon plate, the second plurality of LED bulbs being visible from a front side of the escutcheon plate, so as to provide a visual indication of a close circuit status by lighting when the power distribution circuit is closed;

a third plurality of LED bulbs of a predetermined color mounted in a predetermined arrangement on the escutcheon plate, the third plurality of LED bulbs being visible from a front side of the escutcheon plate, so as to provide a visual indication of a trip circuit status by lighting when the power distribution circuit is tripped;

the first plurality of LED bulbs being electrically connected and mounted such that should any of the first plurality of LED bulbs fail, the remaining LED bulbs are capable of lighting to provide the visual indication of the open circuit status and the failed LED bulbs are capable of being replaced from the front side of the escutcheon plate without interrupting the control power circuit;

the second plurality of LED bulbs being electrically connected and mounted such that should any of the second plurality of LED bulbs fail, the remaining LED bulbs are capable of lighting to provide the visual indication of the close circuit status and the failed LED bulbs are capable of being replaced from the front side of the escutcheon plate without interrupting the control power circuit;

the third plurality of LED bulbs being electrically connected and mounted such that should any of said third plurality of LED bulbs fail, the remaining LED bulbs are capable of lighting to provide the visual indication of the trip circuit status and the failed LED bulbs are capable of being replaced from the front side of the escutcheon plate without interrupting the control power circuit; and the third plurality of LED bulbs being electrically connected to flash on and off repetitively when lighted due to the trip circuit status.

16. A lighted escutcheon plate for power distribution equipment according to claim 15, wherein the first plurality of LED bulbs is arranged in one of a single row and a single column, wherein the second plurality of LED bulbs is arranged in one of a single row and a single column, and wherein the third plurality of LED bulbs is arranged in one of a single row and a single column.

17. The lighted escutcheon plate for power distribution equipment according to claim 15, wherein the first plurality of LED bulbs is arranged in one of a single row and a single column, wherein the second plurality of LED bulbs is arranged in one of a single row and a single column, and wherein the third plurality of LED bulbs is arranged in one of two separate single rows and two separate single columns.

18. The lighted escutcheon plate for power distribution equipment according to claim 15, wherein the LED bulb colors for the first plurality of LED bulbs and corresponding second plurality of LED bulbs are one of green colored LED bulbs for the first plurality of LED bulbs and red colored LED bulbs for the second plurality of LED bulbs, and red colored LED bulbs for the first plurality of LED bulbs and green colored LED bulbs for the second plurality of LED bulbs, and wherein the third plurality of LED bulbs are one of yellow and amber colored LED bulbs.

19. The lighted escutcheon plate for power distribution equipment according to claim 15, wherein each of the first plurality of LED bulbs, the second plurality of LED bulbs, and the third plurality of LED bulbs include a zener diode bridge circuit across each pair of LED bulbs in series succession so that should one of the LED bulbs fail, a voltage will increase across the pair of LED bulbs having the failed LED bulb to cause the remaining LED bulbs in the corresponding first, second and third plurality of LED bulbs to remain lighted, thereby not losing corresponding open, close and trip circuit status indication.

20. The lighted escutcheon plate for power distribution equipment according to claim 15, wherein the escutcheon plate is a control switch plate having handle means extending from the front side of the escutcheon plate for manually opening and closing of the power distribution circuit.

21. The lighted escutcheon plate for power distribution equipment according to claim 15, wherein the escutcheon plate is remotely located and in electrical communication with a control switch plate having handle means extending from the front side of the escutcheon plate for manually opening and closing of the power distribution circuit.

22. The lighted escutcheon plate for power distribution equipment according to claim 20, wherein the escutcheon plate is remotely located and in electrical communication with the control switch plate having handle means extending from the front side of the escutcheon plate for manually opening and closing of the power distribution circuit.

* * * * *